United States Patent [19]
Puerner et al.

[11] Patent Number: 5,743,639
[45] Date of Patent: Apr. 28, 1998

[54] INGREDIENT FEEDER WITH CLOSELY SPACED ENROBING CHAMBER AND BLENDER ASSEMBLY

[75] Inventors: Gale Norman Puerner, Fort Atkinson, Wis.; Keith Douglas White, Loves Park, Ill.; John E. Kress, Waterloo, Wis.

[73] Assignee: APV Crepaco, Inc., Rosemont, Ill.

[21] Appl. No.: 551,997

[22] Filed: Nov. 2, 1995

[51] Int. Cl.$^6$ .................... B01F 7/00; G01F 11/20
[52] U.S. Cl. .................... 366/182.1; 366/150.1; 366/290; 366/154.1; 222/226; 222/368; 222/410
[58] Field of Search .................... 366/76.3, 76.6, 366/76.9, 76.91, 76.92, 76.93, 98, 99, 150.1, 152.1, 152.2, 153.3, 154.1, 155.1, 155.2, 156.1, 156.2, 158.4, 160.2, 162.1, 162.3, 165.3, 165.4, 177.1, 179.1, 182.1, 182.2, 279, 290; 222/368, 367, 226, 410

[56] References Cited

U.S. PATENT DOCUMENTS

| | | |
|---|---|---|
| 3,831,906 | 8/1974 | Wakeman .................... 366/172.2 |
| 3,948,491 | 4/1976 | Karlsson .................... 366/76.91 |
| 4,054,271 | 10/1977 | Lanzillo .................... 366/76.1 |
| 4,148,100 | 4/1979 | Moller .................... 366/156.1 |
| 4,232,973 | 11/1980 | Ligouzat .................... 366/156.1 |
| 4,427,135 | 1/1984 | MacKay et al. .................... 222/368 |
| 4,427,136 | 1/1984 | MacKay et al. .................... 222/368 |
| 4,507,326 | 3/1985 | Tarantino . | |
| 4,627,555 | 12/1986 | Locke .................... 366/155.1 |
| 4,666,069 | 5/1987 | Morine et al. .................... 222/368 |
| 5,240,324 | 8/1993 | Phillips et al. .................... 366/182.2 |
| 5,283,074 | 2/1994 | Campbell . | |

OTHER PUBLICATIONS

"Continuous Ingredient Feeders"; APC Crepaco; Date unknown; Brochure Bulletin M-1-350.
"LF Series 'Automated' Ingredient Feeders"; APV Crepaco; Date unknown; bulletin M-1-300.

Primary Examiner—Tony G. Soohoo
Attorney, Agent, or Firm—Leydig, Voit & Mayer, Ltd.

[57] ABSTRACT

An ingredient feeder meters a selected amount of ingredient into a flowable food product including an enrobing chamber subtended by a blending tube. The blending tube houses an agitator assembly that moves the continuous flow of ingredient in both axial and radial directions as it mixes the ingredient with the flowable food product.

11 Claims, 9 Drawing Sheets

INGREDIENT FEEDER WITH CLOSELY SPACED ENROBING CHAMBER AND BLENDER ASSEMBLY

FIELD OF THE INVENTION

The present invention relates generally to ingredient feeders used in the production of flowable food product, and more particularly, to an ingredient feeder construction with an enrobing chamber that is relatively closely spaced from a blending section to permit improved dispersion of the ingredient with the food product.

BACKGROUND OF THE INVENTION

Known ingredient feeders are used in various food processing applications to introduce one or more ingredients into a flowable base product. For example, ingredient feeders may be used to mix ingredients such as fruits, nuts, candies, or the like into base products such as ice cream, peanut butter, cake batter, pancake batter, or the like.

Typically, conventional ingredient feeders in commercial food processing applications include an inlet section which receives a continuous flow of base product from the equipment upstream in the production line. The ingredient feeder likewise includes a hopper which holds a supply of the ingredient which is to be introduced into the base product. An auger is used to meter the ingredient from the hopper to an enrobing chamber which injects the ingredient into the flowing stream of base product that is received by the inlet section.

The stream of base product is utilized in these systems to carry the ingredient downstream to a blender section. The downstream blender section is typically provided in an upright configuration so that the stream of base product and the ingredient, when introduced an the lower end of the blender section, are agitated as they pass through the blender section, thereby distributing the ingredient throughout the base product. The mixture of base product and ingredient is discharged from the ingredient feeder at an outlet disposed at the opposed end of the blender section.

A common problem with conventional ingredient feeders is the tendency of the ingredient to bind together into clusters when it is injected by the enrobing chamber into the stream of base product. Such ingredient clusters can not be adequately dispersed by the blender section, and accordingly, a less than uniform distribution of the ingredient in the base product is achieved. A less than uniform distribution of the ingredient can result in a mottled and inconsistent finished product since each container of finished product will have a varying amount of the ingredient. In addition, the ingredient clusters tend to accumulate and plug or otherwise slow the stream of base product or the blender section.

The disbursement of the clusters can be improved in some instances by increasing the rotational speed of agitation in the blender section. However, more vigorous agitation in the blender section can result in damage to the ingredient particularly if the ingredient is a soft material such as fruit.

In addition, known ingredient feeders now typically receive flowable base product at inlet section which is disposed on one side of the ingredient feeder and discharge the mixture of base product and ingredient through an outlet section which is disposed on the opposite side of the ingredient feeder. This arrangement can make it difficult to properly orient the ingredient feeder, particularly if the ingredient feeder is being installed in an existing production line. For example, if the production line is arranged such that the base product is being pumped to the outlet side of the ingredient feeder, additional plumbing is required in order to install the ingredient feeder.

Alternatively, the ingredient feeder must be turned around so as to orient the inlet side of the ingredient feeder with the base product supply lines. While turning the ingredient feeder around seems to be a simple solution, it could render the ingredient feeder control panel inaccessible, particularly when the ingredient feeder is installed in a confined space.

Another difficulty now associated with known ingredient feeders is the varying flow rates that must be accommodated. Depending upon the application, the base product flow rate supplied to the ingredient feeder inlet section typically varies over a relatively wide range. Known ingredient feeders are equipped with a blender assembly which is dimensioned according to the anticipated flow rate. For example, an ingredient feeder which will be used in an application where the flow rate is low will have a smaller blender assembly than an ingredient feeder which will be used in an application with a high flow rate. The smaller blender assembly forces the base product to flow more quickly through the blender thus preventing the blender from becoming plugged.

However, in order to provide an ingredient feeder that is adaptable for different flow rates a manufacturer must manufacture blender assemblies in several different sizes. Since each blender assembly contains several parts such as a blender tube, an agitator, an agitator support bearing, and various fittings that must be manufactured in several different sizes, the manufacturing cost associated with providing an ingredient feeder that is adaptable for differing flow rates is substantial.

In addition, some ingredients such as liquids, syrups, slurries and the like can not be introduced into a base product by a conventional ingredient feeder because they can not be metered with an auger. Thus, providing an ingredient feeder with alternative means for introducing these types of ingredients which bypasses the hopper and the auger is desirable.

OBJECTS AND SUMMARY OF THE INVENTION

Accordingly, it is a primary object of the present invention to overcome the deficiencies of existing ingredient feeders.

It is a related object of the present invention to provide an enrobing section and blender section in an ingredient feeder which assures uniform distribution of the ingredient in the base product.

It is a related object of this invention to provide an enrobing section and blending section which has a reduced risk of binding and plugging.

It is a more specific object of the invention to provide an ingredient feeder which can be easily installed in a commercial production line regardless of the direction from which the base product will be supplied.

It is another object of the invention to provide an ingredient feeder which can introduce a plurality of ingredient types, some of which may pose processing difficulties, into the base product.

It is additional object of the invention to provide an ingredient feeder having a blending section which can be adapted to handle variations in product flow rates with a minimal cost.

The present invention provides these and other features and advantages with an ingredient feeder for metering and dispersing an ingredient into a flowable food product. Structurally, a preferred embodiment of the invention comprises a cylindrical enrobing section and an elongate blending section that is closely spaced from the enrobing section. The enrobing section and the blending section cooperate to permit a more uniform dispersion of the ingredient within the flowable food product.

In particular, the enrobing section comprises a cylindrical enrobing chamber, sized to receive a rotor assembly, that has an axis transverse to the ingredient flow. The ingredient exiting the enrobing chamber is passed to a blending section and dispersed within flowable food product in the blending section. The blending section includes an elongate blending tube oriented transverse to the ingredient flow. An agitator is housed within the blending tube. This arrangement draws the ingredient both axially and radially from the enrobing chamber so that it may be uniformly mixed with the flowable product.

One feature of a preferred embodiment of the present invention is that it is non-handed. That is, the blending tube includes two inlet ports that may be utilized to provide flowable product to the ingredient feeder. For example, when a first inlet port is used, the flowable product is pumped through the blending tube from one side of the tube. In a second mode, a second inlet port is utilized so that the flowable may be pumped from the opposed side of the tube prior to introduction of the ingredient.

BRIEF DESCRIPTION OF THE DRAWINGS

The invention will be more readily apparent upon reading the following description of an exemplary embodiment of the invention and upon reference to the accompanying drawings wherein.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention. In addition, it should be understood that certain details that are not necessary for understanding the invention have been omitted for clarity.

DETAILED DESCRIPTION OF THE PREFERRED EMBODIMENT

Generally, the present invention relates to an ingredient feeder which receives a continuous flow of base product at a product inlet section, meters a selected amount of one or more ingredients into the base product at a desired pressure in a first direction with an enrobing section as the base product is passed substantially close to the enrobing section in a second direction, and then blends the ingredient with the food product with a blending section. Inasmuch as the ingredient is drawn both axially and radially into the base product, it is uniformly interspersed therein. The ingredient feeder then provides a mixture of base product and ingredient at an outlet section.

In this regard, the term "ingredient" will be used herein to refer to one or more additives which are introduced into a flowable base product. For example, the ingredient feeder can be used to introduce ingredient particulates such as fruit pieces, nuts, candies, spices, vegetable pieces, and even meat pieces. Similarly, the term "base product" or "flowable product" is meant to include such food products as ice cream, peanut butter, cake batter, pancake batter, cream cheese and frosting that are processed in commercial applications.

Those skilled in the art will appreciate that the ingredient feeder can be used to introduce any ingredient which is in the form of generally solid or semi-solid pieces into any type of base product which is pumpable. In addition, the ingredient feeder includes means which allow ingredients such as liquids and slurries to be introduced into the base product either separately or simultaneously with the substantially solid ingredients. Furthermore, the ingredient feeder is adapted to disperse the ingredient in the base product in a manner which prevents the problem plugging and produces a consistent final product, as described in greater detail below. The ingredient feeder is also easily adapted for applications having differing base product flow rates and is easily installed into existing production lines.

Figure 1:
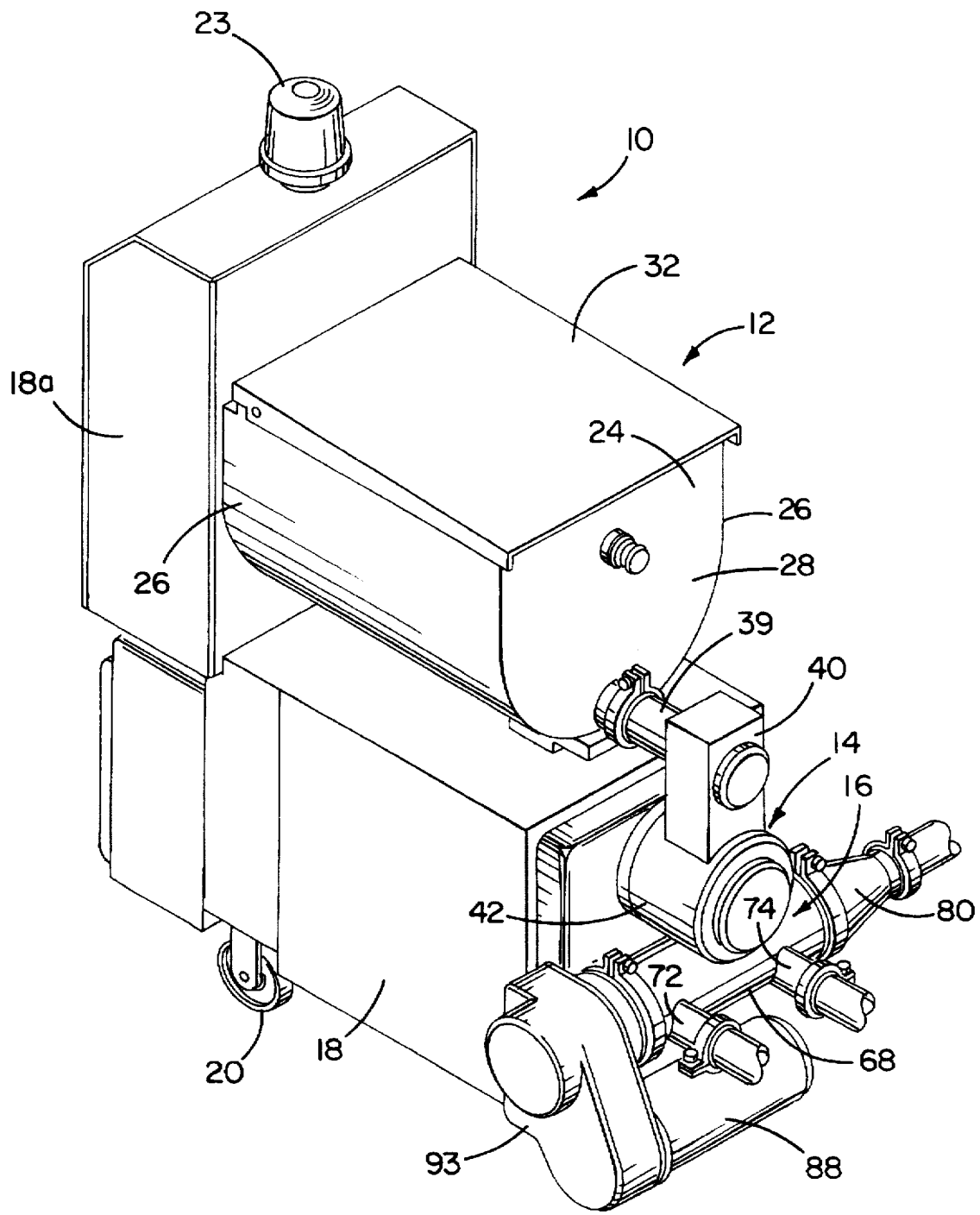
FIG. 1 is a perspective view of the ingredient feeder of the present invention.
Figure 2:
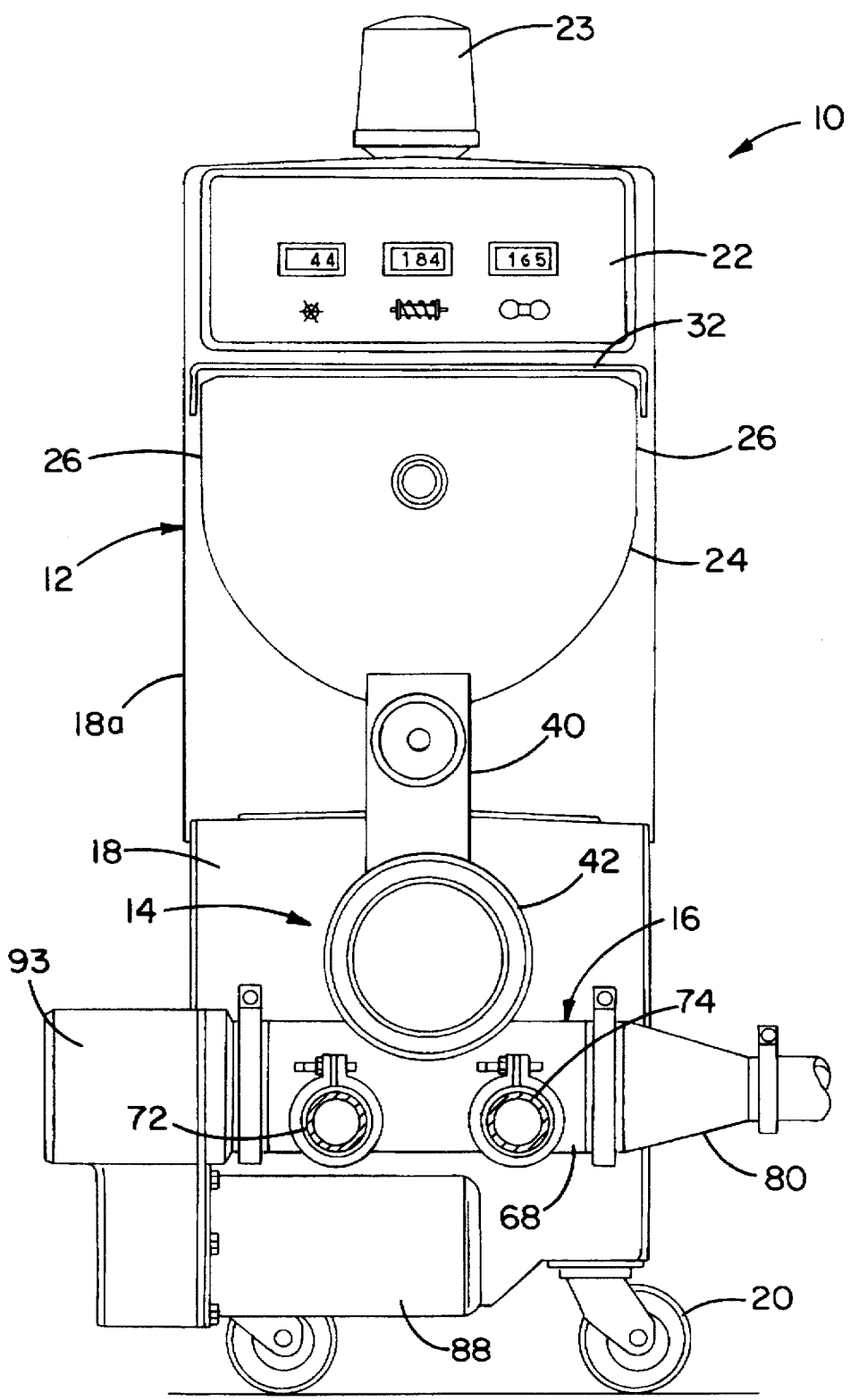
FIG. 2 is a front elevational view of the ingredient feeder of FIG. 1.
Figure 3:
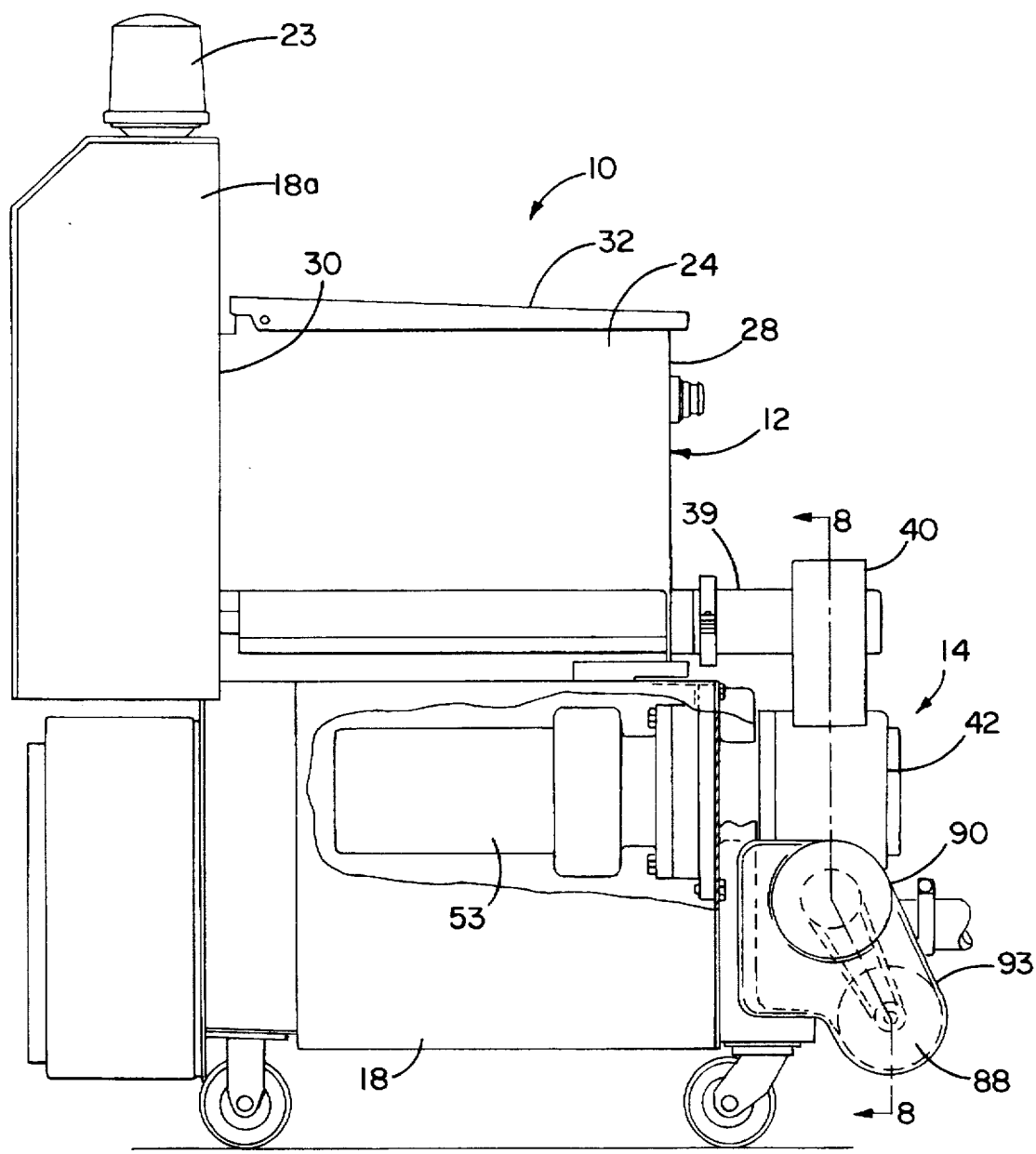
FIG. 3 is a partially cut away side elevational view of the ingredient feeder of FIG. 1.

FIGS. 1-3 illustrate an ingredient feeder 10 according to the present invention. The ingredient feeder 10 comprises an ingredient hopper section 12, an enrobing section 14, and a blending section 16, each of which are arranged in stacked relation and secured to a box-like feeder housing 18. FIGS. 1-3 also show an upright rectangular sub-enclosure 18a that is fixedly secured to the housing 18. Preferably, the housing 18 and sub-enclosure 18a are constructed of stainless steel or other suitable material that can be easily cleaned. The ingredient feeder 10 is provided as a unitary structure that is supported by a plurality of locking caster rollers, one of which is shown as caster roller 20. This permits easy transportability of the ingredient feeder 10 to a desired location in a production line.

The illustrated ingredient feeder 10 also includes a readout panel 22 (FIG. 2) which is mounted for ready operator access at the top front of the sub-enclosure 18a that is attached to the housing 18. In addition, the ingredient feeder 10 includes a warning light 23 which is also mounted at the top of the housing 18 for easy visibility. The ingredient feeder 10 can be provided as an automated unit, and in this regard, the readout panel 22 is utilized by an operator to monitor various operating parameters of the ingredient feeder 10. For example, various metering and flow rates are adjusted as understood by those skilled in the art.

Figure 4:
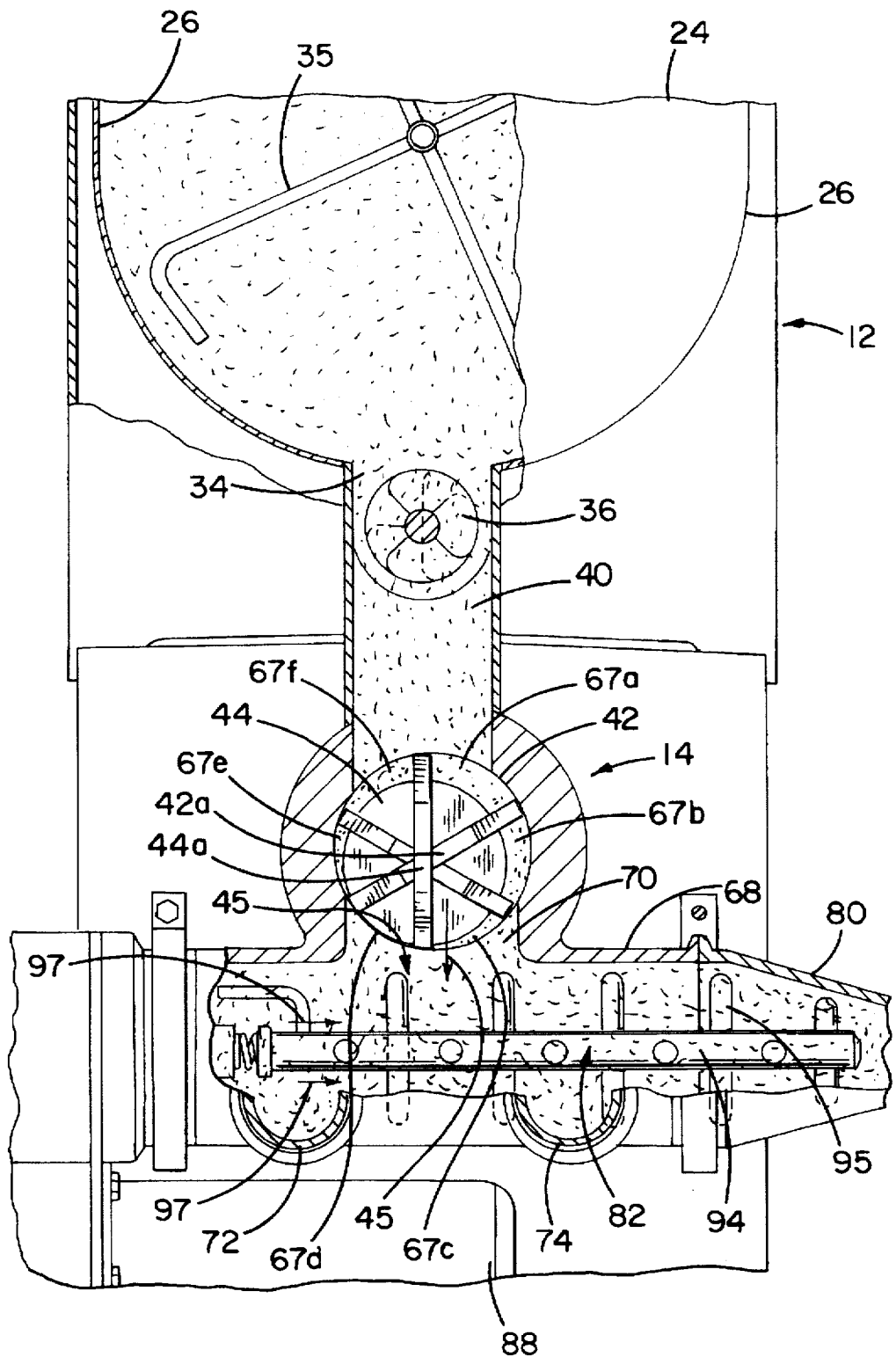
FIG. 4 is a partially cut away view of the ingredient feeder illustrating an ingredient hopper, an enrobing section, and a blending section in greater detail.

The ingredient feeder 10 receives ingredient which is to be dispersed into base flowable product within the ingredient hopper section 12. This section comprises a generally concave ingredient hopper 24 disposed proximate the upper portion of the sub-enclosure 18a. The ingredient hopper 24 is formed with tapering side walls 26, a front wall 28, a back wall 30, and a cover 32. As shown in FIGS. 1 and 4, the side walls 26 of the hopper 24 are configured such that they provide a generally U-shaped well configuration that gravity feeds the ingredient toward an exit port 34 formed in the bottom of the ingredient hopper 24. The ingredient hopper 24 is preferably equipped with an agitator 35 (FIGS. 4 and 5) disposed within the body of the hopper in order to facilitate the continuous feeding of the ingredient from the hopper.

Figure 5:
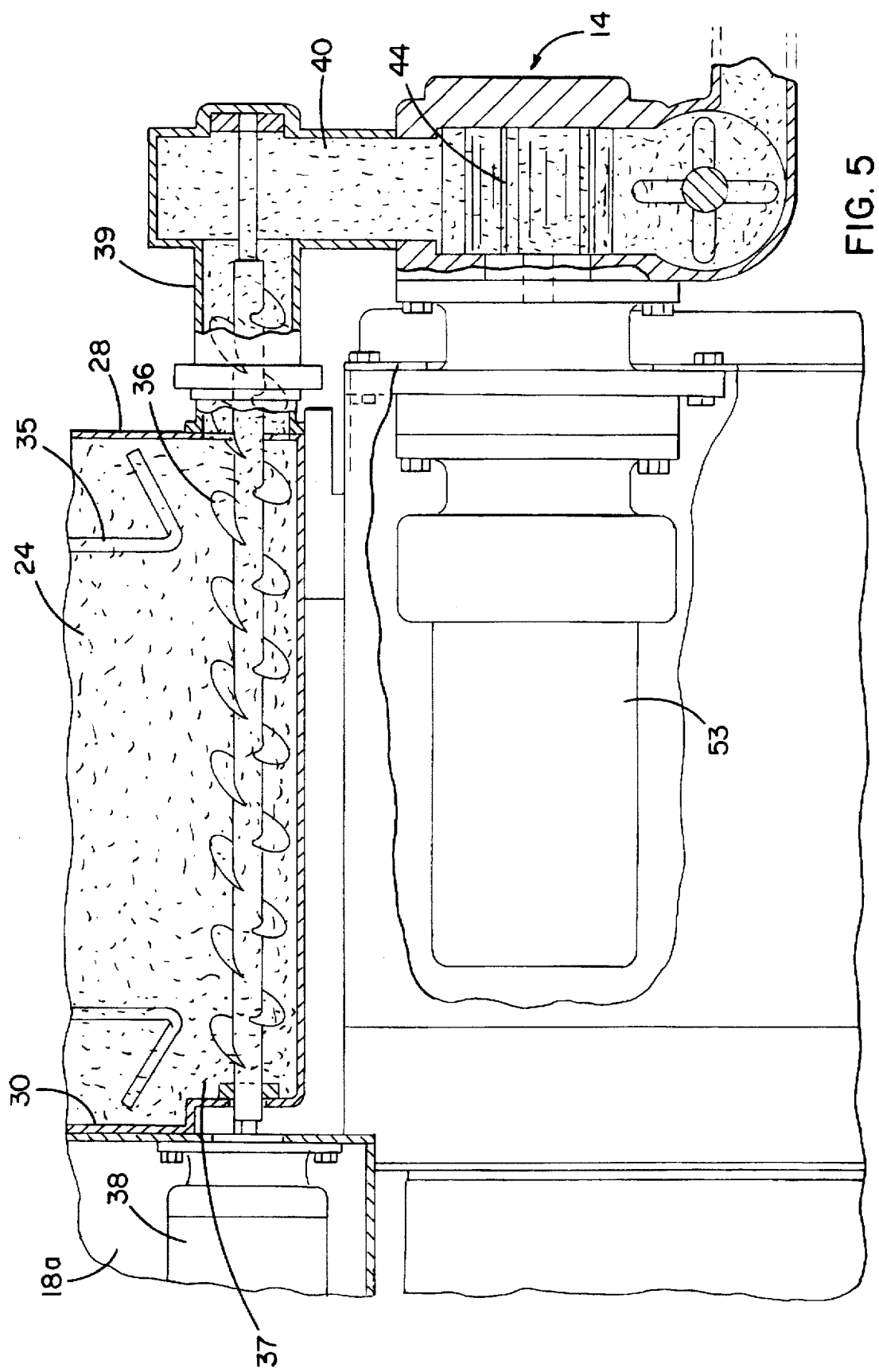
FIG. 5 is an enlarged and partially cut away side view of the ingredient feeder of FIG. 1, showing the ingredient hopper, the enrobing section, and the blending section in greater detail.

FIGS. 4 and 5 also show a metering auger 36 disposed within a complemental channel 37 arranged below the hopper exit port 34 and extending the length of the bottom of the ingredient hopper 24. The auger 36 operates to meter a selected ingredient amount from the ingredient hopper and passes the ingredient to the enrobing section 14. In particular, the auger 36 extends from the back hopper wall 30 past the front hopper wall 28 and into a generally cylindrical feed conduit 39 and terminates at a generally cylindrical feed chute 40 which is integral with and disposed transverse to the feed conduit 39.

The auger 36 is driven by a variable speed electric motor 38 which is disposed in the sub-enclosure 17 generally behind the hopper section 12. The metering auger 36 is configured such that it is driven at a desired angular speed to move the ingredient from the back wall 30 of the hopper beyond the front wall 28 of the hopper and into the feed conduit 39. As shown in FIG. 5, once the ingredient reaches the front wall 28 of the hopper 24 it drops via gravity through the feed chute 40 to the enrobing section 14. Of course, the rotational speed of auger 36 is proportional to the amount of ingredient supplied to the enrobing section 14.

Figure 8:
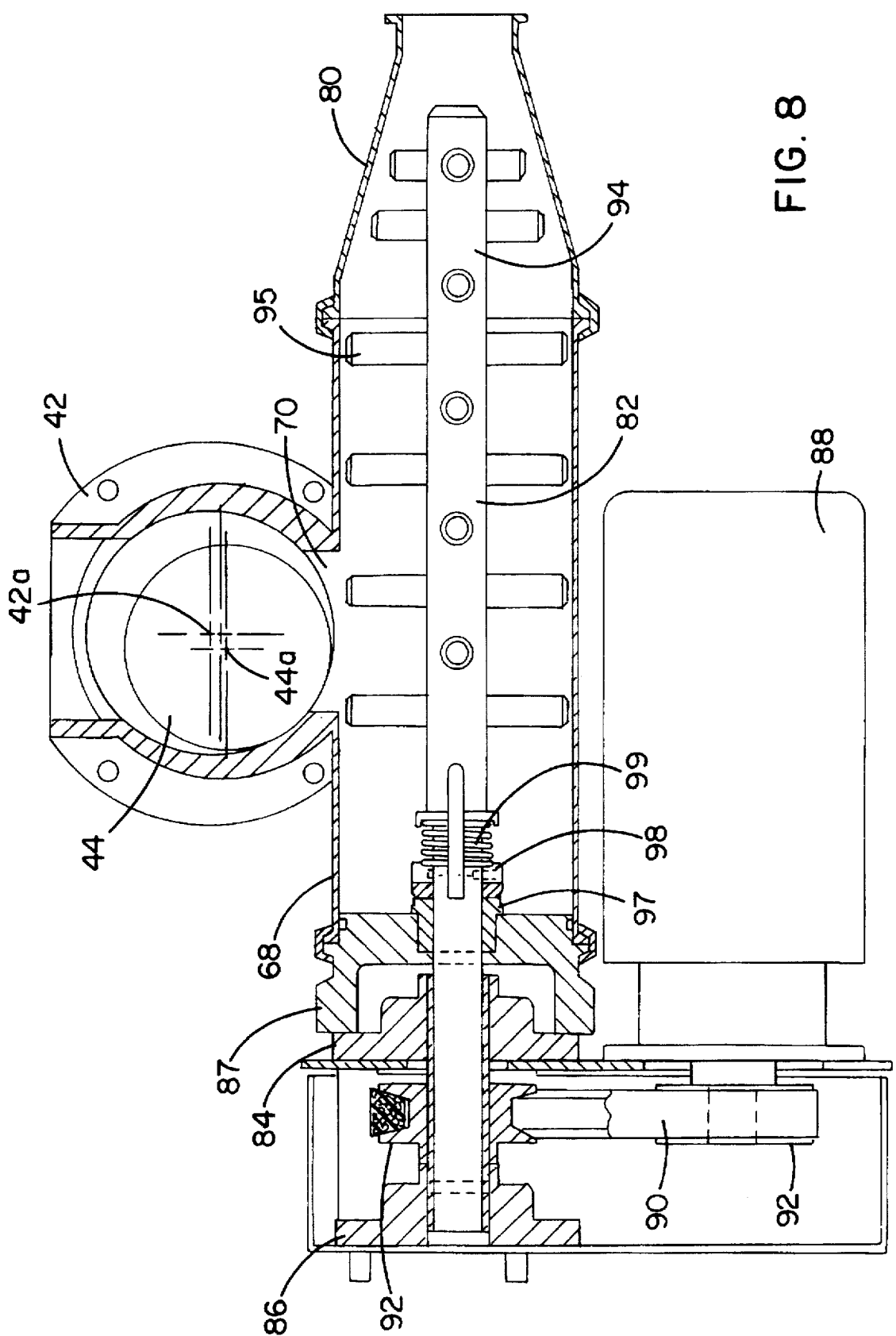
FIG. 8 is a sectional view of the enrobing section and blending section, taken along the lines 8—8 of FIG. 3.

As best shown in FIG. 1, the enrobing section 14 includes a generally cylindrical enrobing chamber 42, having its axis 42a parallel to and spaced downwardly from the auger 36. The enrobing chamber 42 is disposed proximate to the front portion of the housing 18 below the feed chute 40 and just above the blending section 16 such that the feed chute, the enrobing chamber, and the blender section are in substantially the same vertical plane, as shown in FIG. 5. The enrobing section 14 also includes a rotor assembly 44 that is driven about an axis of rotation 44a that is eccentric with respect to the enrobing chamber axis 42a, as best shown in FIG. 8. The enrobing section 14 functions to take the ingredient that is metered through the feed chute 40 and pump the ingredient at a selected pressure in a direction denoted by arrows 45, transversely to the direction of a continuously flowing stream of base product.

Figure 7:
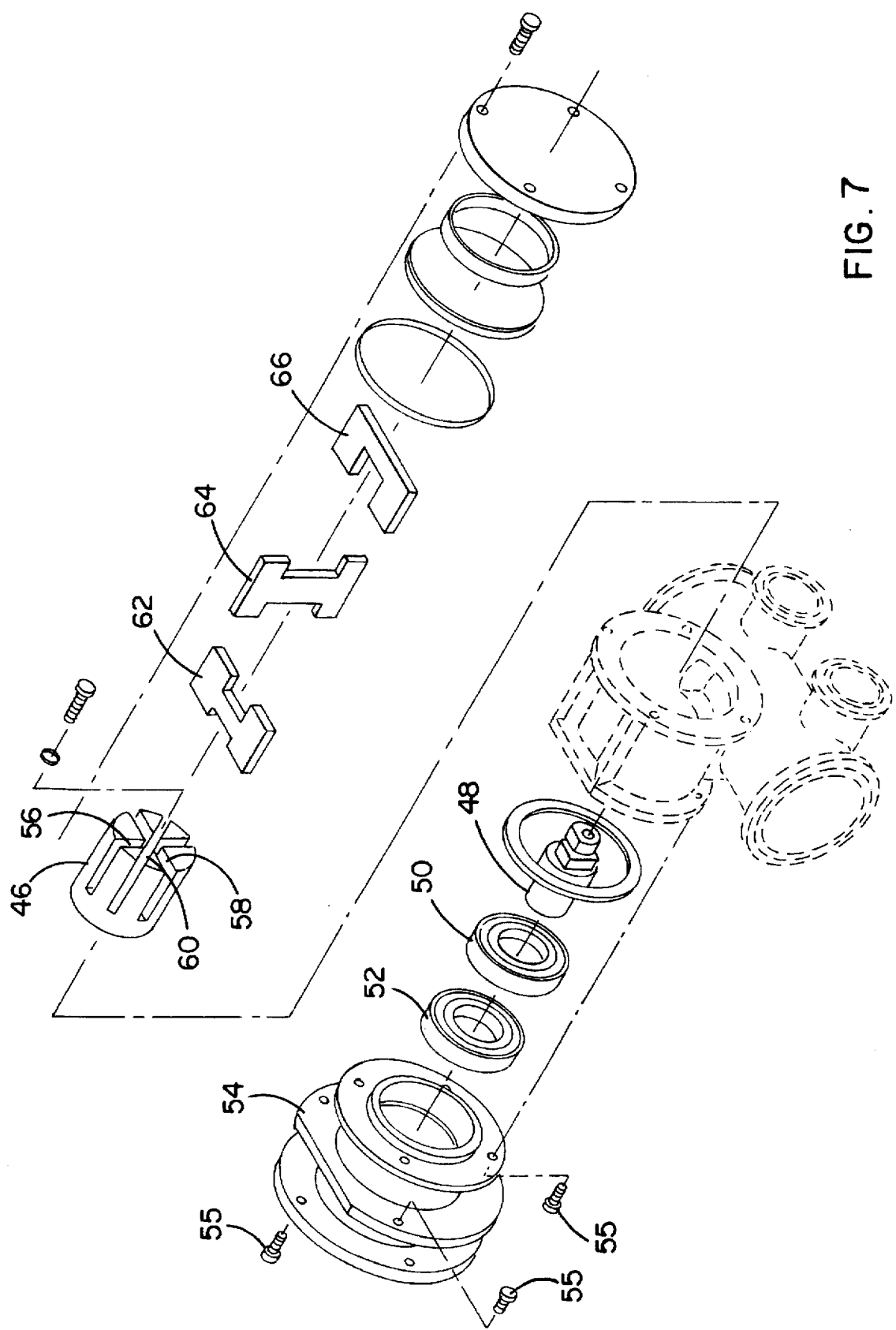
FIG. 7 is a more detailed exploded view of the enrobing section.

In the preferred embodiment, the rotor assembly 44 provides a sliding vane-type rotary pump. In particular, as shown in FIG. 7, the rotor assembly 44 includes a cylindrical rotor 46 having an attached shaft 48 which is supported by a pair of bearings 50, 52. The shaft is disposed in alignment with the rotor axis 44a, eccentric to the enrobing chamber axis 42a. The bearings 50, 52 are mounted in a support flange 54 which, in turn, is mounted on the rear of the enrobing chamber 42 by a plurality of fastening means such as bolts 55. In the illustrated embodiment, the rotor assembly 44 is driven by a variable speed electric motor 53 disposed in the housing 18, as shown in FIGS. 3 and 5.

As best shown in FIG. 7, three radial slots 56, 58, 60 are formed in the rotor 46 such that the slots are spaced 60° from each other. The three slots 56, 58, 60 extend substantially the length of the rotor 46 and are adapted to receive three vane pieces 62, 64, 66, respectively. The vane pieces 62, 64, 66, are preferably formed of a plastic type material and are configured such that when they are fully inserted into the slots 56, 58, 60 they form six spaced cavities 67a, 67b, 67c, 67d, 67e, 67f between the enrobing chamber interior wall and the outer periphery of the rotor 46.

The slots 56, 58, 60 and the vanes 62, 64, 66 are dimensioned such that the vanes can slide longitudinally within the slots. Thus, due to the eccentric axis of rotation of the rotor 46, the vanes are moved back and forth in the slots in order to conform to the interior wall of the enrobing chamber 42. This camming action provided by the enrobing chamber interior wall action expands and contracts the size of the cavities as the rotor 46 is driven. As best shown in FIG. 4, the rotor 46 and the vanes 62, 64, 66 are adapted such that each cavity achieves its maximum size when it rotates past the feed chute 40 and receives the ingredient. As the cavity rotates beyond the feed chute 40 and toward an enrobing section outlet 70 disposed 180° from the feed chute 40 (see FIG. 6), the cavity size diminishes. Once the cavity reaches the enrobing section outlet 70, the vanes defining the cavity have been pushed through to the opposite side of the rotor 46 thereby freeing the ingredient to be injected into the blender section 16. The shrinking of the cavities which move the ingredient in the enrobing chamber 42 pressurize the ingredient thus allowing it to be injected into the blender section 16 at a desired pressure.

Figure 6:
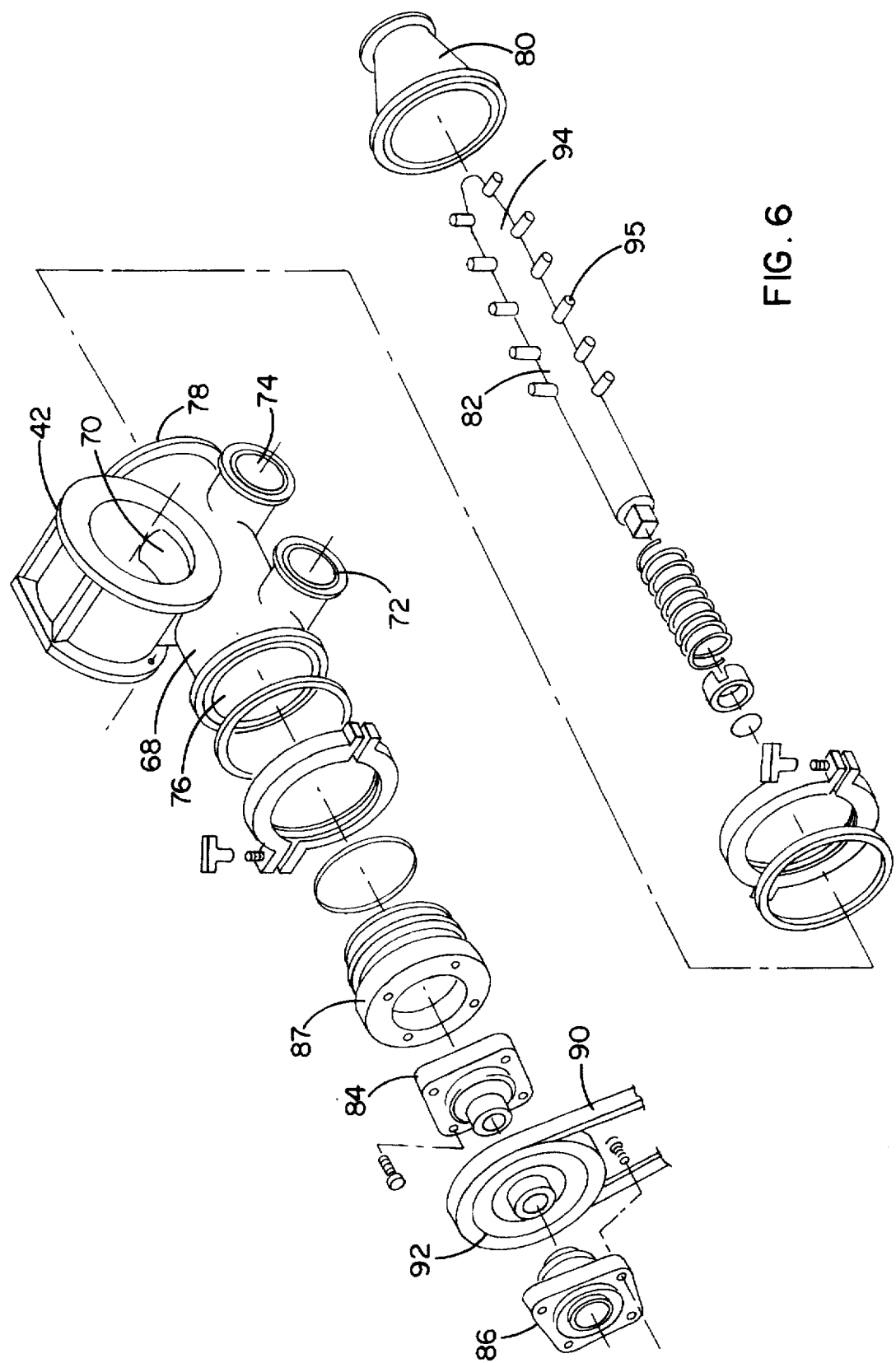
FIG. 6 is an exploded view of the enrobing section and the blending section.

FIGS. 4 and 6 show the details of the blending section 16 according to the present invention. The blending section 16 includes an elongate cylindrical blending tube 68, oriented transversely to the enrobing chamber axis 42a, and disposed subjacent to the enrobing section outlet 70. The blending tube 68 includes a pair of spaced tangentially positioned inlet ports 72, 74 disposed on either side of the enrobing section outlet 70 that may alternatively receive base product. The pair of the tangentially positioned inlet ports 72, 74 also afford gravity draining of the ingredient feeder 10 for easy cleanablility of the ingredient feeder. Similarly, the blending tube 68 includes a pair of outlet ports 76, 78 disposed on either end of the blending tube 68. A reducer 80 is attached to a desired one of the outlet ports 76, 78 so that the blending section may be attached to piping system that leads to the equipment downstream from the ingredient feeder in the production line. In the illustrated embodiment, the reducer is attached to outlet port 78.

An agitator 82 which is dimensioned to conform to the interior dimensions of the blending tube 68 is disposed within the blending tube. The agitator 82 includes a shaft 94 having a selected radial dimension with a plurality of attached knobs 95. As described below, the shaft 94 is replaceable with shafts of varying diameter in order to accommodate varying product flow rates. Of course, agitators with relatively larger diameter shafts 94 will necessarily have relatively smaller knobs 95 in order for the agitator to maintain conformity with the dimensions of the interior of the blending tube 68. The agitator 82 is supported by a pair of bearings 84, 86 each of which is mounted to a bearing support 87 which, in turn, is mounted to the outlet port 76. As best shown in FIGS. 3 and 8, the agitator 82 is driven by a variable speed electric motor 88 which is disposed in the housing 18 generally in front of and below the blending tube. A seal assembly includes a static seal portion 97, a dynamic seal portion 98, and a tension spring 99 which cooperate to seal the outlet port 76, thereby isolating the bearings 84, 86 from the product in the blending tube 68. The electric motor is connected to the agitator shaft by a timing belt 90 and corresponding sprockets 92. The bearings 84, 86, the timing belt 90, and the sprockets 92 are all contained in a housing 93 that is attached to the blender motor 88 and the outlet port 76.

This construction permits relatively easy reversablity of product flow through the ingredient feeder 10. For example, where prior designs required that the flowable food product be introduced at only one end of the blending tube and then transported to the outlet of the tube, the present invention permits connection to either tangential inlet port 72, 74. Likewise, the outlet ports 76, 78 of the tube 68 can be reoriented to permit the exit of the mixed ingredient and food product at either end. In the illustrated embodiment, the ingredient feeder 10 is configured such that the base product may be introduced at tangential inlet port 72 and the mixed ingredient and base product exits the ingredient feeder at outlet port 78. The bearings which support the agitator are mounted to the outlet port 76 and the tangential inlet port 74 is capped (not shown). If the ingredient feeder 10 was configured to introduce the base product at the tangential inlet port 74, the bearings for the agitator would be mounted in the outlet port 78 and the base product would exit the ingredient feeder from outlet port 76.

The pair of spaced tangential inlet ports on the blender tube 68 also enable the ingredient feeder 10 to introduce ingredients in the form of liquids or slurries. These ingredients can not be introduced through the ingredient hopper 24 because they can not be easily metered by an auger. However, with the dual tangential inlet port construction, these ingredients can be introduced at the tangential inlet port that is not configured for receiving the base product, which in the illustrated embodiment is tangential inlet port 74. Thus, the liquid or slurry ingredients are pumped directly to the blender section 16 for intermixing with the base product and the ingredient being fed from the ingredient hopper 24.

Figure 9:
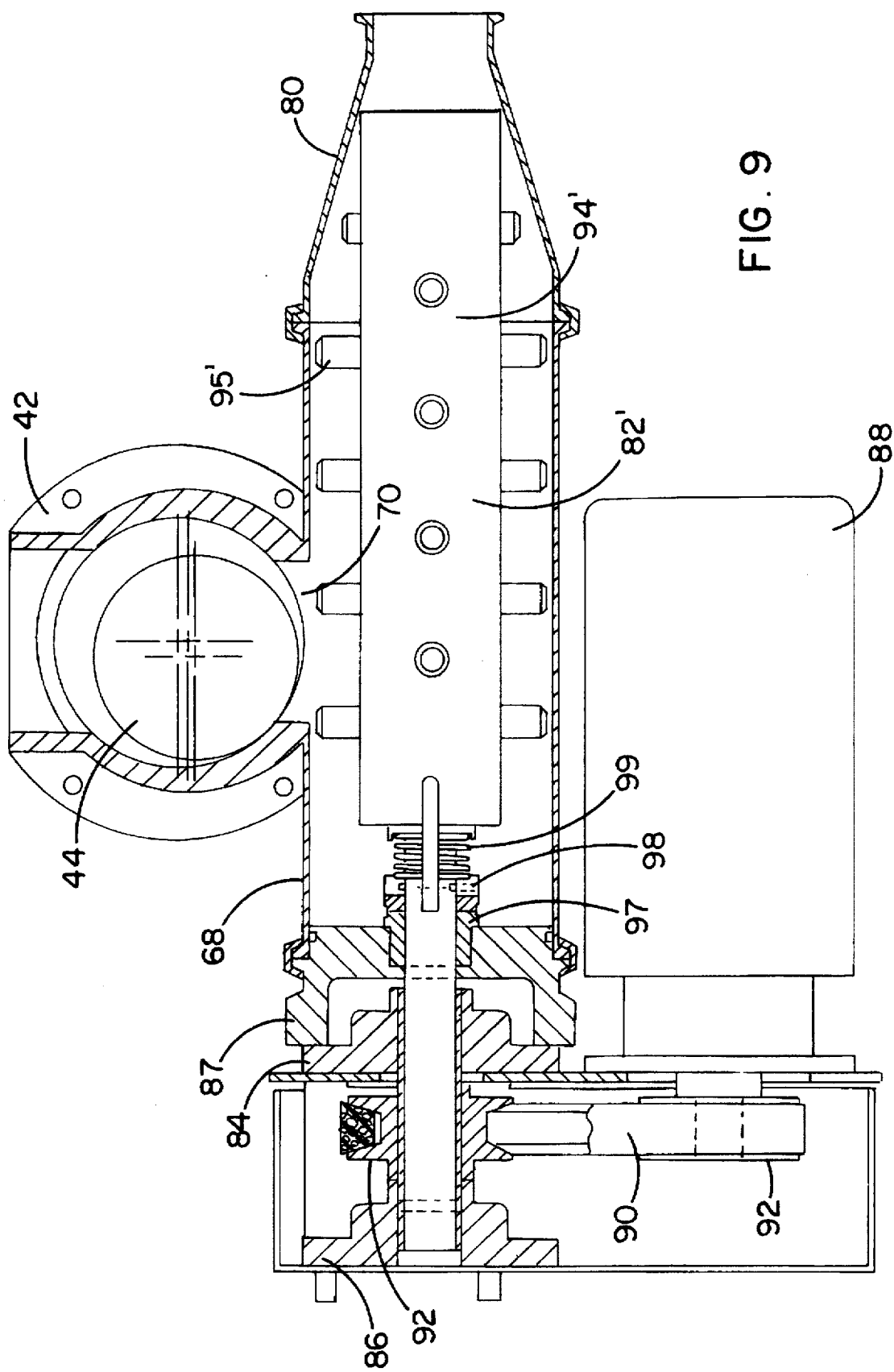
FIG. 9 is an embodiment of the present invention including the agitator with a relatively larger diameter shaft as compared to that shown in FIGS. 1-8.

In order to adapt the ingredient feeder 10 for applications having different base product flow rates, the agitator 82 is replaceable with agitators of different diameters. For example, when the diameter of the agitator shaft 94 is increased, the velocity of the food product passing through the blender section 16 likewise increases. FIG. 9 illustrates an embodiment of the invention wherein the agitator 82 of the embodiment illustrated in FIGS. 1-8 has been replaced with an agitator 82' having a relatively larger diameter shaft 94'. The agitator 82' is disposed within the blending tube 68 and is dimensioned to conform to the interior dimensions thereof. Accordingly, in order to accommodate the relatively larger diameter shaft 94', the agitator 82' has a plurality of attached knobs 95' which are, relatively smaller than the knobs used on the agitator 82. Accordingly, variations in product flow may easily be accomplished with the replacement of one part of the ingredient feeder 10. This avoids the problem of reduced velocity of the flowable product wherein the ingredient is not sufficiently carried by the product and tends to plug the blending section 16.

In operation, an ingredient is loaded into the hopper 24 where it is housed for later introduction into a base product. The hopper 24 gravity feeds the ingredient onto an auger 36 which meters the ingredient from the hopper 24 to the chute 40. The chute 40 drops the ingredient via gravity into the enrobing section 14 where the ingredient is captured by the rotor assembly 44. The rotor assembly 44 pressurizes the ingredient and then injects it directly into the blending section 16 in the direction of arrows 45 in FIG. 4.

Similarly, the flowable food product is provided, under pressure, at one of the blending tube inlets such as inlet 72 in the direction of arrows 97 in FIG. 4. As the product is drawn through the blending tube 68, the agitator 82 begins agitation. As the product is agitated, it is passed directly below the outlet 70 where the ingredient is injected into the blending section 16 by the enrobing section 14 in a first direction. In addition, the agitation of the product simultaneously draws the ingredient into the product in a second direction. The drawing of the ingredient into the product in multiple directions allows the agitator 82 to disperse the ingredient in the product more uniformly. In the illustrated embodiment, the enrobing section 14 draws the ingredient into the base product in the radial direction of the blender tube 68 while the agitation of the base product draws the ingredient into the base product in the axial direction of the blender tube 68.

In contrast, the enrobing section and the blending section in prior designs are spaced apart from each other so that the ingredient is only drawn into the base product in one direction. In particular, prior enrobing sections inject the ingredient into a stream of base product which subsequently moves the ingredient mixture to a blending section disposed a distance from the enrobing section. When the ingredient is only drawn into the base product in one direction when introduced into the base product, it has the tendency to bind together to form clusters. Generally, the blending section cannot adequately disperse these clusters and a less than uniform distribution of the ingredient in the base product is achieved. With the present invention, the ingredient is drawn into the base product in two directions when it is first introduced into the base product, thereby preventing the ingredient from binding into clusters. This results in a more uniform dispersion of the ingredient in the base product.

While the illustrated embodiment has the blender tube 68 directly below the enrobing section 14 with the agitator shaft 82 disposed at a right angle relative to the axis of the rotor 44, it will be appreciated that other orientations of the blending section 16 relative to the enrobing section 14 would yield similar results. The enrobing section 14 and the blending section 16 could be arranged such that the agitator 82 and the rotor axis are in parallel relation or such that the agitator 82 and the rotor axis are at a 45° angle relative to each other or in other orientations. For example, the enrobing and blending sections 14, 16 may even be arranged such that the enrobing chamber axis and the blender tube 68 are not in parallel planes. Those skilled in the art will appreciate that any configuration of the enrobing section 14 and the blending section 16 could be used so long as the enrobing section 14 and the blending section 16 were spaced close enough to each other to allow the ingredient to be drawn into the base product in at least two directions.

An ingredient feeder with an integral enrobing chamber and blending assembly that meets the aforestated objectives has therefore been described. The invention permits a more uniform interspersion of an ingredient with a flowable food product, while permitting easy reversibility. While this invention has been described in connection with the presently contemplated preferred embodiments, it will be understood by those of ordinary skill in the art that variations of the preferred embodiments may be employed, particularly upon consideration of the foregoing teachings. It is therefore intended that the invention may be practiced otherwise than as specifically described herein. Accordingly, this invention includes all modifications encompassed within the spirit and scope of the invention as defined by the following claims.

What is claimed is:

1. An ingredient feeder for metering an ingredient into a flowable food product comprising:

an enrobing section including an enrobing chamber having an inlet and outlet and a rotor assembly disposed within the enrobing chamber that supplies a selected ingredient amount in a first direction at the outlet; and a blending section in communication and close spaced relation with the enrobing chamber outlet, the blending section including an elongate tubular housing oriented in a second direction and an agitator disposed within the housing in dose spaced relation with the enrobing chamber outlet, the blending section being adapted to receive pressurized flowable food product which flows in the second direction such that the ingredient supplied through the enrobing chamber outlet is dispersed in both the first direction and the second direction when intermixed with the flowable food product to provide at least dispersion of the ingredient in the flowable food product in the first and second directions.

2. The ingredient feeder of claim 1 wherein the blending section subtends the enrobing section.

3. The ingredient feeder of claim 1 wherein the blending section includes a first inlet in the elongate tubular housing disposed transversely to the second direction of flow, and wherein flowable food product is supplied to the blending section through the first inlet.

4. The ingredient feeder of claim 3 including a second inlet disposed in the elongate tubular housing, spaced from the first inlet, wherein flowable food product is supplied to the blending section through either the first inlet or the second inlet.

5. A continuous ingredient feeder for mixing an ingredient into a flowing stream of pumpable food product comprising:

a generally cylindrical enrobing chamber housing having an outlet, and an enrobing assembly disposed within the enrobing chamber housing adapted to meter a selected amount of ingredient in a first direction toward the outlet; and a blending assembly including a blending housing disposed subjacent to the enrobing chamber outlet such that the blending housing extends outwardly from opposing sides of the enrobing chamber outlet, an agitator disposed within the blending housing subjacent the enrobing chamber outlet, a first blending assembly inlet located on one side of the enrobing chamber outlet, and a blending assembly outlet located on the side opposite the inlet, the blending assembly receiving pressurized flowable product at the inlet and passing the product past the enrobing chamber outlet in a second direction so that the ingredient is uniformly interspersed within the flowable product.

6. The ingredient feeder of claim 5 including a second inlet in the blending assembly, spaced from the first inlet, wherein flowable food product is supplied to the ingredient feeder through either the first inlet or the second inlet.

7. The ingredient feeder of claim 5 wherein the agitator has a first cross sectional area adapted use with a first flowable food product flow rate and wherein the agitator is rotatably supported in the blending housing, the agitator being removable such that a second agitator having a second cross sectional area adapted for use with a second flowable food product flow rate may be supported in the blending housing.

8. An ingredient feeder for metering an ingredient into a flowable food product comprising:

an enrobing section including an enrobing chamber, an enrobing chamber outlet and a rotor assembly disposed within the enrobing chamber that supplies a selected ingredient amount in a first direction at the enrobing chamber outlet;

wherein the rotor assembly comprises a rotor having an axis of rotation eccentric from with the central axis of the enrobing chamber, and plurality of vane pieces disposed within openings formed in the rotor, the vane pieces cooperatively engaging the ingredient as it is moved throughout the enrobing chamber; and a blending section in communication with the enrobing chamber outlet, the blending section including an elongate tubular housing oriented in a second direction and an agitator, the blending section being adapted to receive pressurized flowable food product which flows in the second direction such that the ingredient supplied through the enrobing chamber outlet is dispersed in both the first direction and the second direction when intermixed with the flowable food product thereby ensuring the ingredient is uniformly interspersed in the flowable food product.

9. A continuous ingredient feeder for mixing an ingredient into a flowing stream of pumpable food product comprising:

a generally cylindrical enrobing chamber housing an enrobing assembly therewithin, the enrobing assembly metering a selected amount of ingredient in a first direction at an enrobing chamber outlet, wherein the enrobing assembly comprises a rotor and a plurality of vane pieces, the vane pieces disposed within openings formed in the rotor and cooperatively engaging the ingredient as it is moved throughout the enrobing chamber; and a blending assembly including a blending housing subtending the enrobing chamber outlet such that the blending housing extends from opposing sides of the enrobing chamber outlet, an agitator housed within the blending assembly, a blending assembly inlet located on one side of the enrobing chamber outlet, and a blending assembly outlet located on the side opposite the inlet, the blending assembly receiving pressurized flowable product at the inlet and passing the product past the enrobing chamber outlet in a second direction so that the ingredient is uniformly interspersed within the flowable product.

10. The ingredient feeder of claim 9 wherein the rotor has an eccentric axis of rotation relative to the centerline of the enrobing chamber.

11. A continuous ingredient feeder for mixing an ingredient into a flowing stream of ice cream provided by a processing station, the ingredient feeder comprising:

a generally cylindrical enrobing chamber housing having an outlet, and an enrobing assembly disposed within the enrobing chamber housing adapted to meter a selected amount of ingredient in a first direction toward the outlet; and a blending assembly including a blending housing subtending the enrobing chamber outlet such that the blending housing extends outwardly from opposing sides of the enrobing chamber outlet, an agitator disposed within the blending housing in close spaced relation with the enrobing chamber outlet, a blending assembly inlet located on one side of the enrobing chamber outlet, and a blending assembly outlet located on the side opposite the inlet, the blending assembly receiving pressurized ice cream at the inlet and passing the product past the enrobing chamber outlet in a second direction so that the ingredient is uniformly interspersed within the ice cream.

* * * * *